United States Patent [19]

Ehrhardt

[11] Patent Number: 4,974,086

[45] Date of Patent: Nov. 27, 1990

[54] FREQUENCY CONVERSION CIRCUIT FOR A COLOR TELEVISION CHANNEL

[75] Inventor: Dietmar Ehrhardt, Siegen, Fed. Rep. of Germany

[73] Assignee: Deutsche ITT Industries GmbH, Freiburg, Fed. Rep. of Germany

[21] Appl. No.: 359,173

[22] Filed: May 31, 1989

[30] Foreign Application Priority Data

Jul. 2, 1988 [EP] European Pat. Off. ......... 88110617.3

[51] Int. Cl.$^5$ ........................................... H04N 5/605
[52] U.S. Cl. .................................... 358/198; 358/197
[58] Field of Search ..................... 358/197, 198, 188

[56] References Cited

U.S. PATENT DOCUMENTS

| | | | |
|---|---|---|---|
| 4,090,145 | 5/1978 | Webb . | |
| 4,470,070 | 9/1984 | Griffis | 358/198 |
| 4,528,592 | 7/1985 | Apeldoorn | 358/197 |
| 4,709,270 | 11/1987 | Mehrgardt | 358/198 |
| 4,710,814 | 12/1987 | Gassman et al. | 358/197 |
| 4,782,385 | 11/1988 | Gunter et al. | 358/188 |
| 4,789,897 | 12/1988 | Kappeler et al. | 358/188 |
| 4,799,212 | 1/1989 | Mehrgardt . | |
| 4,901,151 | 2/1990 | Mehrgardt et al. | 358/197 |
| 4,929,905 | 5/1990 | Ruitenbourg | 358/188 |

FOREIGN PATENT DOCUMENTS 0213222 8/1985 European Pat. Off. .
0180339 10/1985 European Pat. Off. .

OTHER PUBLICATIONS

Jack E. Volder, "The CORDIC Trigonometric Computing Technique", *IRE Transactions on Electronic Computers*, Sep. 1959, pp. 330–334.

*Primary Examiner*—James J. Groody
*Assistant Examiner*—Kim Yen Vu
*Attorney, Agent, or Firm*—Thomas L. Peterson

[57] ABSTRACT

A color television channel that includes a video channel and at least one sound channel is converted by means of a low-IF converter from the RF band directly to the baseband by analog quadrature conversion. The quadrature output signals are digitized. A correcting stage eliminates the quadrature errors and forms a corrected quadrature pair which drives a video stage and a sound conversion stage. The sound conversion stage includes at least one sound channel converter which converts the low-IF sound channel to its baseband by another (digital) quadrature conversion.

11 Claims, 3 Drawing Sheets

FREQUENCY CONVERSION CIRCUIT FOR A COLOR TELEVISION CHANNEL

BACKGROUND OF THE INVENTION

1. Field of the Invention

The present invention relates to a frequency conversion circuit for a color television channel whose signal is received as a radio-frequency antenna or cable signal and which contains a video channel and at least one sound channel separated in frequency from the video channel.

2. Description of the Related Art

The video channel in a color television channel contains the composite color signal of the respective color television standard, e.g., PAL or NTSC. If two sound channels are present, the two channels contain the frequency-modulated television stereo sound according to any of the European stereo standards, while in the U.S.A., for example, the stereophonic signal may be contained in only one sound channel.

Frequency conversion in color television receivers is commonly performed by means of a tuner, which converts the color television channel to be received to a fixed intermediate-frequency band of about 33 MHz to 40 MHz, from which the various signal components are converted to the baseband.

Besides this conventional IF conversion, there is a method which is referred to as low-IF or zero-IF conversion, wherein the radio-frequency signal is converted to the baseband or to a very low frequency band directly, i.e., without IF conversion. The radio-frequency signal is converted by means of a quadrature signal pair having a fixed frequency in the range of the radio-frequency signal, so that the mixer signal is a quadrature signal pair at the low frequency. From this quadrature signal pair, the desired sideband can be isolated at baseband by various methods used in single-sideband systems, such as the phasing method or the "third" method.

This separation, as is well known, is achieved by adding or subtracting the modified quadrature signal pair by means of a suitable combinatorial circuit. In the phasing method, one signal of the quadrature signal pair is shifted in phase by 90° before this coupling circuit, and in the third method, the quadrature signal pair is subjected to a second quadrature conversion. To separate adjacent signals, only low-pass filters to which the combined signal is applied are necessary in both cases.

In the case of television signals, such a direct frequency conversion is critical, because asymmetries and phase errors in the quadrature-signal path produce moiré on the television screen. This is mainly due to the high picture-carrier content in the RF signal, because this content is usually not fully suppressed during the single-sideband conversion and, thus, becomes visible during reproduction as a fixed-frequency spurious signal within the video signal. A certain remedy is provided by digital signal processing, in which case the digitization should take place as early as possible in the signal path, because changes in the quadrature-signal paths due to aging, temperature variations, settings, and interference can then be largely avoided Furthermore, precisely defined filter circuits can be implemented digitally, which would hardly be realizable in analog form without alignment.

Such a frequency conversion circuit for color television signals, including the associated sound channels, is described in U.S. Pat. No 4,710,814. FIG. 2 of that patent specification shows a low-IF converter whose quadrature output signals are digitized by means of two analog-to-digital converters and fed to the video-signal-processing circuit, which delivers the digitized composite color signal. The digitized quadrature signal pair is also fed through a combination stage to the sound-processing stage, which converts the two sound channels to a low frequency and separates them from each other. The frequency of the local oscillator lies approximately in the middle between the picture carrier and the chrominance subcarrier, so that in the video signal a visible spurious signal is formed at 4.4 MHz by the residual picture carrier.

SUMMARY OF THE INVENTION

The present invention provides an improved frequency conversion circuit for a color television channel which further suppresses the interference in the reproduced picture. By a further development of the invention, two sound channels, if present, are to be separable in the simplest possible manner.

The invention is based on the idea, on the one hand, to free the digitized quadrature signal pair by means of a correcting stage from all quadrature-signal errors as far as possible and, on the other hand, to place the spurious signal caused by the residual picture carrier in the signal-free frequency range between the video channel and the sound channel or the first sound channel, this resulting spurious signal being selectively suppressible by additional filtering means.

BRIEF DESCRIPTION OF THE DRAWINGS

The invention and further advantageous features thereof will mow be explained in greater detail with reference to the accompanying drawings, in which.

DETAILED DESCRIPTION OF THE PREFERRED EMBODIMENT

All figures refer to the PAL standard with stereo sound channels according to the European television stereo sound standard. If only one sound channel is transmitted, such as in the USA, the subcircuits required by the second sound channel can be dispensed with.

Figure 1:
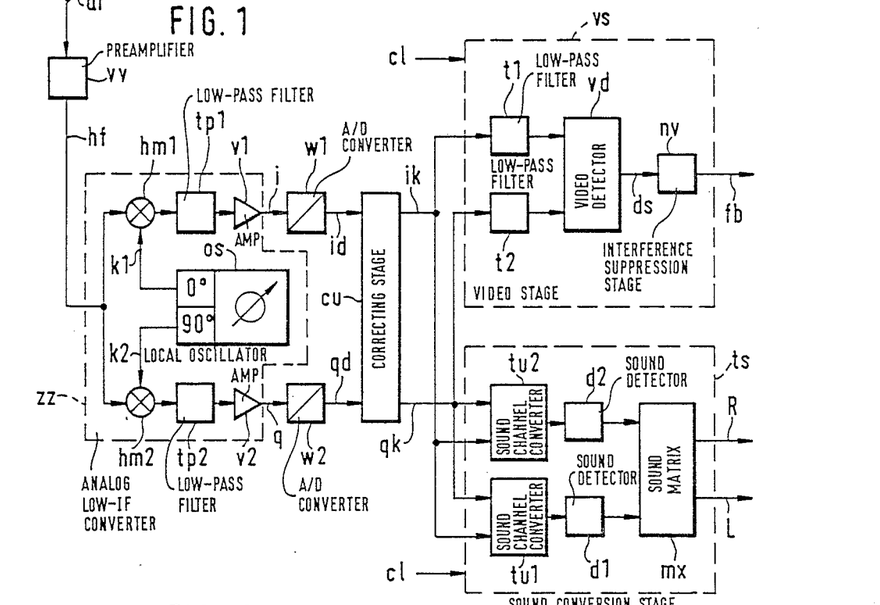
FIG. 1 illustrates a block diagram of an embodiment of the frequency conversion circuit according to the invention.

In the block diagram of FIG. 1, an antenna ar, which receives an RF television channel fk, is connected to the input of a preamplifier vv, which provides coarse preselection by means of an internal band-pass filter (not shown) and which amplifies the antenna signal to a higher level and feeds it as an RF signal hf to a subsequent low-IF converter zz.

In the low-IF converter zz, the television channel fk contained in the RF signal hf is converted to the baseband or to a low frequency band. This is done by means of a first conversion signal k1 and a second conversion signal k2, which are generated by a local oscillator os and applied to the conversion-signal inputs of a first HF mixer hm1 and a second HF mixer hM2, respectively, whose signal inputs are fed with the RF signal hf. The two conversion signals k1, k2 are at quadrature. In the following, the first conversion signal k1 is assumed to be a cosine-wave signal, and the second conversion signal k2 is assumed to be a sine-wave signal. The first and second HF mixers hm1, hm2 thus form the beginnings of an in-phase-signal path and a quadrature-signal path, respectively, for the down-converted television channel.

Figure 3:
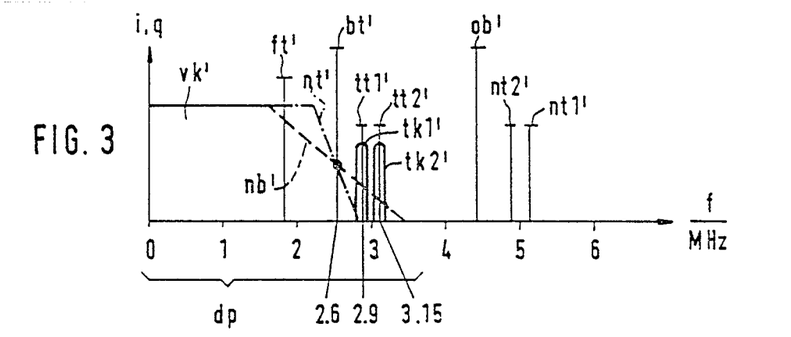
FIG. 3 illustrates the frequency scheme of the analog or digital quadrature signal pair after the low-IF converter.

The first and second HF mixers hm1, hm2 are followed by a first analog low-pass filter tp1 and a second analog low-pass filter tp2, respectively, whose outputs are connected to a first analog amplifier v1 and a second analog amplifier v2, respectively. The passband of each of these two analog low-pass filters, tp1, tp2 which needs to be defined only coarsely, is slightly greater than one-half the bandwidth of the RF television channel fk. This is illustrated in FIG. 3 by a passband dp, delineated by the bracket underneath the spectrum. Actual filtering with precisely defined slopes of the response curves takes place only after digitization, namely in digital low-pass filters contained in a video stage vs. and a sound conversion stage ts.

Figure 2A:
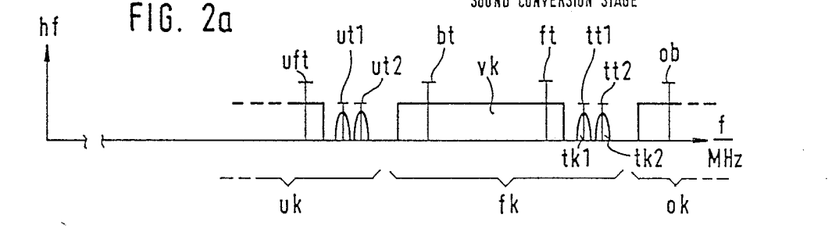
FIGS. 2a and 2b illustrate the frequency scheme of an exemplary RF television channel.
Figure 2B:
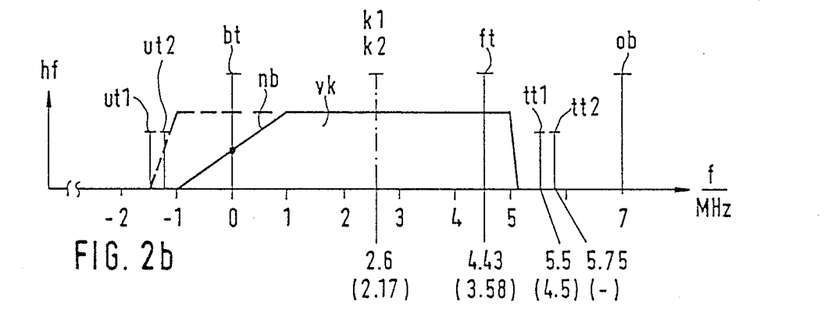

In the example assumed, i.e., in the PAL color television standard, the frequency of the local oscillator os and, thus, of the two conversion signals k1, k2 is 2.6 MHz above the frequency of the respective picture carrier bt, as shown in FIG. 2b. The value of this frequency follows from the assumption of a fictitious frequency located in the middle between the upper standard bandlimit of the video channel fk at about 5 MHz and the lower standard band limit of a first sound channel tk1 at about 5.4 MHz. The distance between this fictitious frequency and the associated picture carrier bt must be divided by the number 2. The result represents the frequency offset of the local oscillator os with respect to the respective picture carrier bt In the NTSC color television standard, a frequency offset value of 2.17 MHz is obtained for the local oscillator, as shown in parentheses in FIG. 2b.

The output signals from the low-IF converter zz, namely an analog in-phase signal i and an analog quadrature signal q, are digitized by means of first and second analog-to-digital converters w1, w2 to form a digital in-phase signal id and a digital quadrature signal qd, respectively. It must, of course, be ensured that the conversion rate is high enough with respect to the signal lo frequency, with the first and second analog low-pass filters tp1, tp2 serving as anti-aliasing filters. The quality of the preselection, the characteristics of the two HF mixers hm1, hm2, and the harmonic contents of the two conversion signals k1, k2 must be so adapted to one another that no spurious signals will be generated within the useful band.

Despite the digitization, the picture and sound reproduction of the television channel is still unsatisfactory, because in the analog low-IF converter zz, distortions have already been caused in the analog quadrature-signal pair i, q, which are further increased by errors in the two analog-to-digital converters w1, w2. The digital quadrature-signal pair id, qd thus contains offset, phase, and amplitude errors which impair the picture and sound reproduction. These errors are eliminated by a correcting stage cu, which is represented by a block in FIG. 1 and is shown in a detailed block diagram in FIG. 6.

Another correcting stage for a quadrature-modulated signal pair containing a television channel is disclosed, for example, in U.S. Pat. No. 4,799,212.

The correcting stage cu delivers a corrected in-phase signal ik and a corrected quadrature signal qk, which are both fed to the video stage vs and the sound conversion stage ts. The frequency scheme of these signals is shown schematically in FIG. 3. As a result of the low-IF conversion, the useful signal appears folded about 0 Hz, so that the useful-signal band extends from about 0 Hz to 3.5 MHz. This useful-signal band is separated in the video stage vs by means of first and second low-pass filters t1, t2, whose skirts are Nyquist skirts for a low-IF picture carrier bt' at 2.6 MHz. Their slopes are so chosen that the low-IF first and second sound channels tk1', tk2' are optimally suppressed (the first sound channel is the one having the lower carrier frequency of the two sound channels).

The two low-pass filters t1, t2 are followed by a video detector vd, which generates a demodulated video signal ds from the low-pass-filtered quadrature-signal pair. Such a detector for digital quadrature-signal pairs is described, for example, in U.S. Pat. No. 4,090,145. In Jack E. Volder, "The CORDIC Trigonometric Computing Techniques," *IRE TRANSACTIONS ON ELECTRONIC COMPUTERS*, Sept. 1959, pp. 330-334, an iterative computing technique, referred to as the CORDIC technique, is described. The Volder article also describes a suitable circuit which determines the magnitude and angle of the resultant from a digital quadrature-signal pair, so that it can also be used to advantage as an AM detector.

Figure 4:
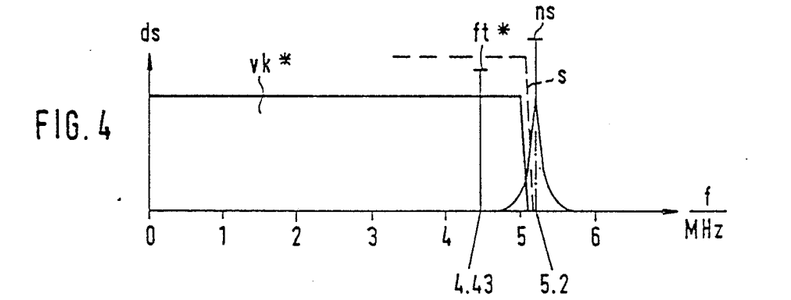
FIG. 4 illustrates the frequency scheme of the composite color signal with a spurious signal after the video detector.

The frequency scheme of the demodulated video signal ds is shown schematically for the PAL color-television standard in FIG. 4. The video channel vk* extends from 0 Hz to about 5 MHz, with the chrominance subcarrier ft* located at 4.43 MHz. The first sound channel at 5.5 MHz and the possibly present second sound channel at 5.75 MHz are suppressed by the preceding low-pass filtering. A spurious signal ns at 5.2 MHz is shown above the upper standard band limit of the video signal at 4.5 MHz. The spurious signal ns is generated during demodulation and is caused by residual quadrature errors of the incompletely suppressed picture carrier bt'. The center frequency of this spurious signal ns is equal to twice the frequency departure of the local oscillator os from the RF picture carrier bt.

The spurious signal ns can be sufficiently suppressed without influencing the video signal by means of the schematically shown skirt of the response curve of an interference suppression filter nv. The output signal is a composite color signal fb, which is fed to the subsequent signal-processing circuits (not shown in FIG. 1).

In the frequency conversion circuit of FIG. 1, sound signals are processed in the sound conversion stage ts. This stage contains first and second sound channel converters tu1, tu2, which are fed directly with the corrected quadrature-signal pair ik, qk. The first and second sound channel converters tu1, tu2 combine with the low IF converter zz to form two single-sideband converters in which the corrected quadrature-signal pair ik, qk is converted with a locally generated quadrature-signal pair by the third method. The first and second low- IF sound carriers tt1', tt2' (shown in FIG. 3) are transformed from 2.9 MHz and 3.15 MHz, respectively, to a considerably lower frequency, e.g., a frequency between 0 and 200 kHz.

The respective sound channel is filtered out by suitable low-pass filters and demodulated in first and second sound detectors d1, d2. The sound detectors d1, d2 are followed by a sound matrix mx, which delivers the right and left sound signals R, L as digital signals.

The two sound detectors d1, d2 derive the associated angular value from the respective quadrature-signal pair via a read-only memory ("ROM") containing an arc-tangent table or by the CORDIC technique referred to above, and differentiate this angular value, e.g., by means of a digital high-pass filter, to obtain the respective demodulated sound channel in digital form.

FIGS. 2a and 2b, which were already briefly discussed above, show the frequency scheme of the RF signal hf containing the different television channels. FIG. 2a shows the television channel fk and its upper and lower adjacent channels ok, uk. The television channel fk contains a video channel vk with the picture carrier bt and the chrominance subcarrier ft as well as the first and second sound channels tk1, tk2, whose frequency bands are located above the video channel vk.

To make efficient use of the RF-signal band, the television channels are close together. FIG. 2b shows the television channel fk with the adjacent channels, particularly their carriers, on a larger scale. The frequencies given are the spacings from the picture carrier bt of the television channel to be received, fk. Since a television transmission is a vestigial-sideband transmission, the enlarged frequency range of the video channel vk is indicated by the dashed line at the lower end. In the PAL color television standard, this range, which is transmitted by the transmitter, extends from about −1.5 MHz to about 5 MHz. The parenthesized frequency values in FIG. 2b refer to the NTSC color television standard.

The solid line of the video channel vk represents the standard frequency scheme for the receiving end. It shows the Nyquist skirt nb for the picture carrier bt, which meets the zero line at about −1 MHz. Above the video channel, the frequencies of the first and second sound carriers tt1, tt2 are located at 5.5 MHz and 5.75 MHz, and an upper adjacent picture carrier ob of the upper adjacent channel ok is positioned at 7 MHz. In the NTSC color television standard, the second sound carrier tt2 is not present. The lower standard band limit of the video channel at −1 MHz is followed by a lower second adjacent sound carrier ut2 at −1.25 MHz and a lower first adjacent sound carrier ut1 at −1.5 MHz.

The individual television channels in the RF signal hf are thus rather close together, so that steep-slope selective means are necessary to separate the individual channels and the individual components. Particularly disturbing is the upper adjacent picture carrier ob, since its level is transmitted with 40% of the channel power. FIG. 2b also shows the first and second conversion signals k1, k2 as a dash-dot line at 2.6 MHz (2.17 MHz for NTSC).

FIG. 3, which was also briefly referred to above, shows the frequency scheme of the analog quadrature-signal pair i, q, which corresponds to that of the digitized quadrature-signal pair id, qd or the corrected quadrature-signal pair ik', qk. It shows within a folded low-IF video channel vk' a low-IF chrominance subcarrier ft' and the low-IF picture carrier bt' with its Nyquist skirt nb, (dashed line), whose center is located at 2.6 MHz in the PAL color television standard. However, the Nyquist skirt nb, intersects the first and second low-IF sound carriers tt1', tt2' at 2.9 MHz and 3.15 MHz, respectively. Therefore, a steeper Nyquist skirt nt' (dash-dot line) is used as the skirt of the response curves of the first and second low-pass filters t1, t2, so that the low-IF first and second sound carriers tt1', tt2' are fully suppressed. As disturbance variables, the frequency scheme of FIG. 3 shows the low-IF adjacent picture carrier ob' of the upper adjacent channel at about 4.4 MHz and low-IF first and second adjacent sound carriers nt1', nt2' of the lower adjacent channel, which are located above the adjacent picture carrier ob'.

Figure 5:
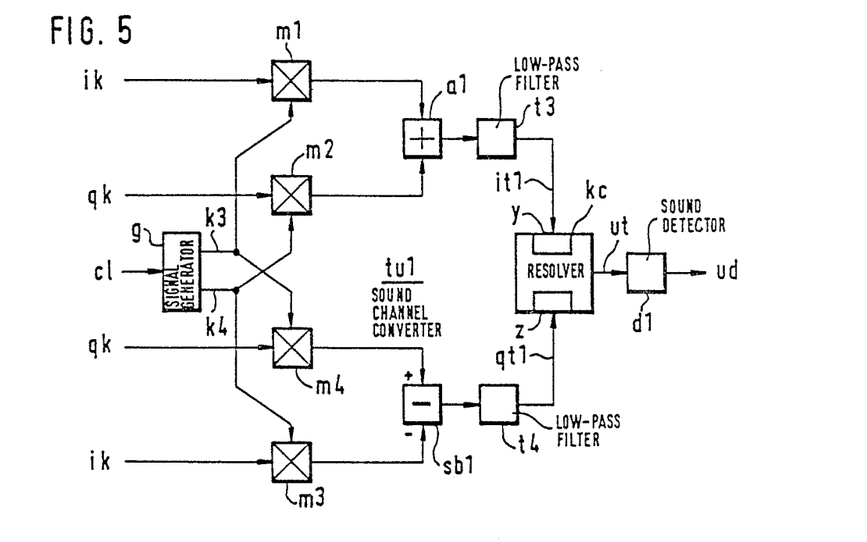
FIG. 5 illustrates a block diagram of an embodiment of a sound conversion stage.

FIG. 5 shows a preferred embodiment of the first sound channel converter tu1, which converts the first low-IF sound channel tk1' of the corrected quadrature-signal pair ik, qk at 2.9 MHz to the baseband, i.e., causes a frequency shift by about 2.9 MHz toward lower frequencies. If the subsequent demodulation uses the CORDIC technique, the split into the two quadrature components can be retained. Since both the corrected in-phase signal ik and the corrected quadrature signal qk have to be converted with a third conversion signal k3 and a fourth conversion signal k4 in quadrature with the third conversion signal, which conversion signals have a frequency of about 2.9 MHz, four multipliers m1, m2, m3, m4 are necessary.

The frequency of these two conversion signals k3, k4 is derived in a conversion-signal generator g from a system clock cl, e.g., by integral frequency division. A common frequency offset of the two signals has no disturbing effect on the CORDIC technique.

The quadrature relation between the third and fourth conversion signals k3, k4 is achieved, for example, by passing an inverted signal and a noninverted signal of twice the frequency of the conversion signal through one single-stage binary frequency divider each (not shown). The outputs of the two frequency dividers are then the two quadrature conversion signals k3, k4.

In FIG. 5, the corrected in-phase signal ik is applied to the signal inputs of the first and third multipliers m1, m3, whose modulation inputs are fed with the third conversion signal k3 and the fourth conversion signal k4, respectively. The corrected quadrature signal qk is applied to the signal inputs of the second and fourth multipliers m2, m4, whose modulation inputs are fed with the fourth conversion signal k4 and the third conversion signal k3, respectively.

The outputs of the first and second multipliers m1, m2 are each coupled to one input of a first adder a1, whose output is connected to the input of a third low-pass filter t3.

The outputs of the third and fourth multipliers m3, m4 are connected to the subtrahend input and the minuend input, respectively, of a first subtracter sb1, whose output feeds the input of a fourth low-pass filter t4. An in-phase component it1 of the first sound channel, which appears at the output of the third low-pass filter t3, is fed to an in-phase input y of a resolver kc, which uses the CORDIC technique, for example. A quadrature component qt1 of the first sound channel, which appears at the output of the fourth low-pass filter t4, is fed to a quadrature input z of the resolver kc.

As the sound channels are frequency-modulated signals, only that output of the resolver kc which delivers the angular value of the applied quadrature-signal pair is of importance in the sound conversion. As a signal, this angular value thus corresponds to a lower undemodulated sound channel ut. This signal is demodulated by means of the first sound detector d1 to obtain a lower demodulated sound channel ud.

If a second sound channel is present, it will be converted with the identical second sound channel converter tu2, but the frequency of the associated conversion-signal pair must be about 3.15 MHz instead of 2.9 MHz. The output signal of the second sound detector d2 following this second sound channel converter tu2 is an upper demodulated sound channel od. As in FIG. 1, the right and left sound signals R, L can be derived from the lower and upper demodulated sound channels ud, od by means of the sound matrix mx, shown in FIG. 1.

The sound channel, folded about Hz, is freed from interfering adjacent signals by means of the third and fourth low-pass filters t3, t4. The passbands of the two low-pass filters t3, t4 must thus be identical, and they must lie between about 0.1 MHz and 0.2 MHz, because the sound channel is still frequency-modulated. In its neighborhood are the upper frequency range of the video channel, the possibly present second sound channel spaced 0.25 MHz from the first sound channel, and the spurious signal caused by the residual picture carrier and spaced 0.3 MHz from the first sound channel. All these interfering signals are suppressed if the slopes of the response curves of the third and fourth low-pass filters t3, t4 are sufficiently steep.

The frequency conversion in the respective sound channel converter tu1, tu2 can also be regarded as a generation of difference frequencies which takes place according to the rules of trigonometric transformation. Each of the four multipliers m1, m2, m3, m4 forms the product of two out of four trigonometric functions, and the adding combinatorial circuit a1 and the subtracting combinatorial circuit sb1 each combine two of these products. If the products are formed and combined in a suitable manner, the output signals from the two combinatorial circuits al, sb1 are at quadrature and the frequency is the difference frequency.

In the simplest case, the digital conversion signals k3, k4 contain only the digital values 0, +1, −1, because the four multipliers m1, m2, m3, m4 are then easiest to realize. The applied corrected quadrature-signal pairs ik, qk must then only be transferred through the circuit and inverted or set to zero. This simplifies the second quadrature conversion considerably.

Figure 6:
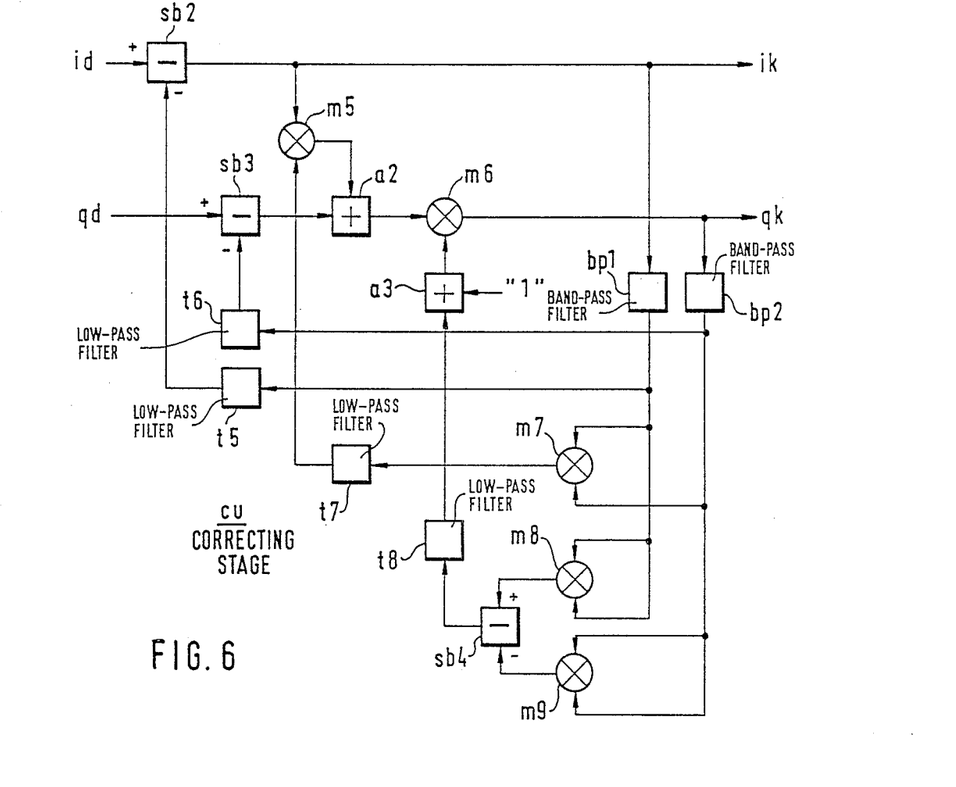
FIG. 6 illustrates a block diagram of an embodiment of the correcting stage.

FIG. 6 shows an embodiment of the correcting stage cu in a block diagram. The correcting stage cu contains all subcircuits for correcting offset, phase, and amplitude errors as well as subcircuits for determining the magnitudes of the respective errors.

The digitized in-phase signal id is applied to the minuend input of a second subtracter sb2, which delivers the corrected in-phase signal ik. The digitized quadrature signal qd is applied to the minuend input of a third subtracter sb3, which, like the second subtracter sb2, serves to correct offset errors.

The output of the third subtracter sb3 is coupled to one input of a second adder a2, whose other input is fed with a correction signal derived from the in-phase component, so that the quadrature signal is rotated in phase, so to speak. The second adder a2 thus acts as a phase corrector.

The output of the second adder a2 feeds the first input of a sixth multiplier m6, whose second input is fed with a correction signal that increases or decreases the value of the quadrature component. The output of the sixth multiplier m6 is the corrected quadrature signal qk.

Since the low-IF picture carrier bt, is contained in the low-IF quadrature-signal pair ik, qk during the horizontal synchronizing pulses in unmodulated form, it can be filtered out by means of narrow-band filters. Advantageously, the band filters are activated via switches only during the horizontal synchronizing pulse. Offset, phase, and amplitude errors can thus be determined via the quadrature errors of the filtered-out low-IF picture carrier bt, In the embodiment of FIG. 6, this is done by means of first and second band-pass filters bp1, bp2, which are connected to the corrected in-phase signal ik and the corrected quadrature signal qk, respectively. If the local oscillator os has an offset frequency of 2.6 MHz, the center frequencies of the first and second band-pass filters bp1, bp2 will also be 2.6 MHz.

The outputs of the first and second band-pass filters bp1, bp2 are fed through fifth and sixth low-pass filters t5, t6 to the subtrahend inputs of the second subtracter sb2 and the third subtracter sb3, respectively. Both offset errors are thus corrected.

A phase error is present if the averaged product of the in-phase signal and the quadrature signal is a DC value. This product formation and averaging are performed by means of a seventh multiplier t7 and a subsequent seventh low-pass filter t7. The output of the seventh low-pass filter t7 feeds one input of a fifth multiplier m5, whose other input is connected to the output of the second subtracter sb2. The output of the fifth multiplier m5 forms the above-mentioned in-phase component, which is added to the quadrature component by means of the second adder a2 to cause the phase rotation. If no phase error is present, the output of the fifth multiplier m5 is 0 and the second adder a2 does not change the value of the quadrature signal.

In FIG. 6, the amplitude comparison for the amplitude correction is performed by squaring the output signals from the first and second band-pass filters bp1, bp2 by means of an eighth multiplier m8 and a ninth multiplier m9, respectively. It is also possible to rectify the output signals or form their absolute values.

The outputs of the eighth and ninth multipliers m8, m9 feed the minuend input and subtrahend input, respectively, of a fourth subtracter sb4, whose output is filtered by means of an eighth low-pass filter t8. The output of this low-pass filter t8 is connected to one input of a third adder a3, whose other input is fed with the digital value 1, and whose output is coupled to the second input of the sixth multiplier m6.

If the amplitudes are equal, the correction factor fed to the sixth multiplier m6 will thus have the value 1, so that the sixth multiplier m6 will leave the applied quadrature signal unchanged. If the eighth low-pass filter t8 is replaced by an integrator, the output of the latter will be connected directly to the sixth multiplier m6, thus eliminating the need for the third adder a3. All low-pass filters t5, t6, t7, t8 are, of course, replaceable by a conventional integral-action controller or a conventional PID (proportional, integral, differential) controller.

In the digital portion of the frequency converter, it is advantageous to adapt the respective clock signal derived from the system clock cl to the respective maximum signal frequency. If the frequency conversion circuit is implemented as an integrated circuit, this reduces the amount of chip area required by the filters, particularly in the sound conversion stage ts. In the video stage vs, the clock rate is above 10 MHz, while in the sound conversion stage ts, it can be reduced for the demodulated sound output signals od, ud down to 32 kHz.

What is claimed is:

1. A frequency conversion circuit for a color television channel comprising an RF signal that includes a video channel and a first sound channel, said frequency conversion circuit comprising:

an analog low-IF converter having an input and a pair of outputs, said input receiving said RF signal, said analog low-IF converter including means for generating a first conversion signal and a second conversion signal in quadrature with said first conversion signal, said first and second conversion signals having frequencies that are fixed and that lie within said color television channel approximately in the middle between the picture carrier frequency and a second frequency, said second frequency lying approximately in the middle between the upper standard band limit of the video channel and the lower standard band limit of said first sound channel, said analog low-IF converter generating at its outputs an analog quadrature-signal pair comprising an in-phase signal and a quadrature signal, said analog quadrature-signal pair including a low-IF video channel and a first low-IF sound channel;

a first analog-to-digital converter that digitizes said in-phase signal to generate a digitized in-phase signal, and a second analog-to-digital converter that digitizes said quadrature signal to generate a digitized quadrature signal;

a correcting stage that corrects offset, phase and amplitude errors of said digitized in-phase signal and said digitized quadrature signal to generate a corrected digitized in-phase signal and a corrected digitized quadrature signal;

a video stage comprising:

a first low-pass filter having an input connected to receive said corrected digitized in-phase signal and having an output, and a second low-pass filter having an input connected to receive said corrected digitized quadrature signal and having an output, each of said first and second low-pass filters having a Nyquist skirt with respect to said low-IF picture carrier, the slope of the skirt being such that said low-IF sound channel is suppressed;

a video detector having first and second inputs connected to receive the outputs of said first and second low-pass filters, respectively, and having an output that provides a demodulated video output signal; and an interference suppression filter having an input connected to said output of said video detector, said interference suppression filter having high attenuation at twice the frequency value of the low-IF picture carrier; and a first sound channel converter connected to receive said corrected digitized in-phase signal and said corrected digitized quadrature signal from said correcting stage, said first sound channel converter comprising: means for generating a third conversion signal and a fourth conversion signal, said fourth conversion signal in quadrature with said third conversion signal, said third and fourth conversion signals having frequencies that lie approximately in the middle of said low-IF sound channel;

a first multiplier having inputs that receive said corrected digitized in-phase signal and said third conversion signal, and having an output that provides a first multiplier output signal;

a second multiplier having inputs that receive said corrected digitized quadrature signal and said fourth conversion signal, and having an output that provides a second multiplier output signal;

a first combinatorial circuit having inputs that receive said first and second multiplier output signals and having an output that provides a first combinatorial circuit output signal;

a third low-pass filter having an input that receives said first combinatorial circuit output signal and having an output that provides an in-phase component of a converted sound channel output signal, said third low-pass filter having a passband that is no broader than the bandwidth of the sound channel;

a third multiplier having inputs that receive said corrected digitized in-phase signal and said fourth conversion signal, and having an output that provides a third multiplier output signal;

a fourth multiplier having inputs that receive said corrected digitized quadrature signal and said third conversion signal, and having an output that provides a fourth multiplier output signal;

a second combinatorial circuit having inputs that receive said third and fourth multiplier output signals and having an output that provides a second combinatorial circuit output signal; and a fourth low-pass filter having an input that receives said second combinatorial circuit output signal and having an output that provides a quadrature component of said converted sound channel output signal, said fourth low-pass filter having a passband that is no broader than the bandwidth of the sound channel.

2. The frequency conversion circuit as defined in claim 1, wherein:

said RF signal includes a second sound channel;

said analog quadrature-signal pair generated by said analog low-IF converter includes a second low-IF sound channel; and said frequency conversion circuit comprises a second sound channel converter having a circuit configuration substantially identical to said first sound channel converter, said third and fourth conversion signals in said second sound channel converter having a frequency lying approximately in the middle of said second low-IF sound channel.

3. The frequency conversion circuit as defined in claim 2, wherein in said second sound channel converter: said conversion-signal pair corresponding to said third and fourth conversion signals of said first sound channel converter have digital values that are limited to the values 0, $-1$ and $+1$; and each of said four multipliers delivers an output value of zero when the conversion signal to its respective conversion signal input is zero; delivers an output value that is inverted from the value of the respective one of the corrected quadrature-signal pair applied to its input when the value of the applied conversion signal is $-1$; and delivers an output value equal to the value of the respective one of the corrected quadrature-signal pair applied to its input when the value of the applied conversion signal is +1.

4. The frequency conversion circuit as defined in claim 1, wherein:
said third and fourth conversion signals comprise a cosine wave and a sine wave, respectively;
said first combinatorial circuit is a first adder having a first input connected to said output of said first multiplier, having a second input connected to said output of said second multiplier and having an output coupled to said input of said third low-pass filter; and
said second combinatorial circuit is a first subtracter having a minuend input connected to said output of said fourth multiplier, a subtrahend input connected to said output of said third multiplier and having an output coupled to said input of said fourth low-pass filter.

5. The frequency conversion circuit as defined in claim 1, wherein:
said third and fourth conversion signals have digital values that are limited to the values 0, −1, +1;
said first multiplier provides an output signal corresponding to zero when said third conversion signal has a value of 0, provides an output signal having a value corresponding to the value of said corrected digitized in-phase signal when said third conversion signal has a value of +1, and provides an output signal having a value corresponding to the inverted value of said corrected digitized in-phase signal when said third conversion signal has a value of −1;
said second multiplier provides an output signal corresponding to zero when said fourth conversion signal has a value of 0, provides an output signal having a value corresponding to the value of said corrected digitized quadrature signal when said fourth conversion signal has a value of +1, and provides an output signal having a value corresponding to the inverted value of said corrected digitized quadrature signal when said fourth conversion signal has a value of −1;
said third multiplier provides an output signal corresponding to zero when said fourth conversion signal has a value of 0, provides an output signal having a value corresponding to the value of said corrected digitized in-phase signal when said fourth conversion signal has a value of +1, and provides an output signal having a value corresponding to the inverted value of said corrected digitized in-phase signal when said fourth conversion signal has a value of −1; and
said fourth multiplier provides an output signal corresponding to zero when said third conversion signal has a value of 0, provides an output signal having a value corresponding to the value of said corrected digitized quadrature signal when said third conversion signal has a value of +1, and provides an output signal having a value corresponding to the inverted value of said corrected digitized quadrature signal when said third conversion signal has a value of −1.

6. A frequency conversion circuit as defined in claim wherein said video detector comprises a first resolver which produces an output equal to the magnitude of the respective resultant of said corrected digitized quadrature-signal pair applied to its inputs.

7. The frequency conversion circuit as defined in claim 1, wherein said first sound channel converter further comprises a resolver having an in-phase input, a quadrature input and an output, said in-phase signal output of said third low-pass filter connected to said in-phase input of said resolver, said quadrature signal output of said fourth low-pass filter connected to said quadrature input of said resolver, said resolver producing an output equal to the angular value of the respective resultant of said in-phase signal and said quadrature signal.

8. A frequency conversion circuit for a color television channel comprising an RF signal that includes a video channel and a first sound channel, said frequency conversion circuit comprising:
an analog low-IF converter having an input and a pair of outputs, said input receiving said RF signal, said analog low-IF converter mixing said RF signal with first and second conversion signals and generating at its outputs an analog quadrature-signal pair comprising an in-phase signal and a quadrature signal, said analog quadrature-signal pair including a low-IF video channel and a first low-IF sound channel;
a first analog-to-digital converter that digitizes said in-phase signal to generate a digitized in-phase signal, and a second analog-to-digital converter that digitizes said quadrature signal to generate a digitized quadrature signal;
a correcting stage that corrects offset, phase and amplitude errors of said digitized in-phase signal and said digitized quadrature signal to generate a corrected digitized in-phase signal and a corrected digitized quadrature signal;
a video stage comprising:
a first low-pass filter having an input connected to receive said corrected digitized in-phase signal and having an output, and a second low-pass filter having an input connected to receive said corrected digitized quadrature signal and having an output, each of said first and second low-pass filters having a Nyquist skirt with respect to said low-IF picture carrier, the slope of the skirt being such that said first low-IF sound channel is suppressed;
a video detector having first and second inputs connected to receive the outputs of said first and second low-pass filters, respectively, and having an output; and
an interference suppression filter having an input connected to said output of said video detector, said interference suppression filter having high attenuation at twice the frequency value of the low-IF picture carrier; and
a first sound channel converter connected to receive said corrected digitized in-phase signal and said corrected digitized quadrature signal from said correcting stage, said first sound channel converter comprising:
a generator of an in-phase component of said converter sound channel that converts said corrected digitized quadrature-signal pair to a lower frequency band, said in-phase component generator multiplying said corrected digitized in-phase signal by a third conversion signal to provide a first product, multiplying said corrected digitized quadrature signal by a fourth conversion signal to provide a second product, combining said first and second products in a first combinatorial circuit to produce a first combined signal, and low-pass filtering said first combined signal to generate said in-phase component; and a generator of a quadrature component of said converter sound channel that converts said corrected digitized quadrature-signal pair to a lower frequency band, said quadrature component generator multiplying said corrected digitized in-phase signal by said fourth conversion signal to provide a third product, multiplying said corrected digitized quadrature signal by said third conversion signal to provide a fourth product, combining said third and fourth products in a second combinatorial circuit to produce a second combined signal, and low-pass filtering said second combined signal to generate said quadrature component.

9. The frequency conversion circuit as defined in claim 8, wherein said first sound channel converter further comprises a resolver having an in-phase input, a quadrature input and an output, said in-phase input connected to receive said in-phase component output of said in-phase component generator, said quadrature input connected to receive said quadrature component output of said quadrature component generator, said resolver producing an output equal to the angular value of the respective resultant of said in-phase component and said quadrature component.

10. The frequency conversion circuit as defined in claim 8, wherein said third and fourth conversion signals have a frequency that lies approximately in the middle of said first low-IF sound channel.

11. The frequency conversion circuit as defined in claim 8, wherein:

said RF signal includes a second sound channel;

said analog quadrature-signal pair generated by said analog low-IF converter includes a second low-IF sound channel; and said frequency conversion circuit comprises a second sound channel converter having a circuit configuration substantially identical to said first sound channel converter, said third and fourth conversion signals in said second sound channel converter having a frequency lying approximately in the middle of said second low-IF sound channel.

* * * * *